Oct. 29, 1929.  M. A. KENDALL  1,733,541
CARRIER FOR CONVEYERS
Filed April 16, 1926  2 Sheets-Sheet 2
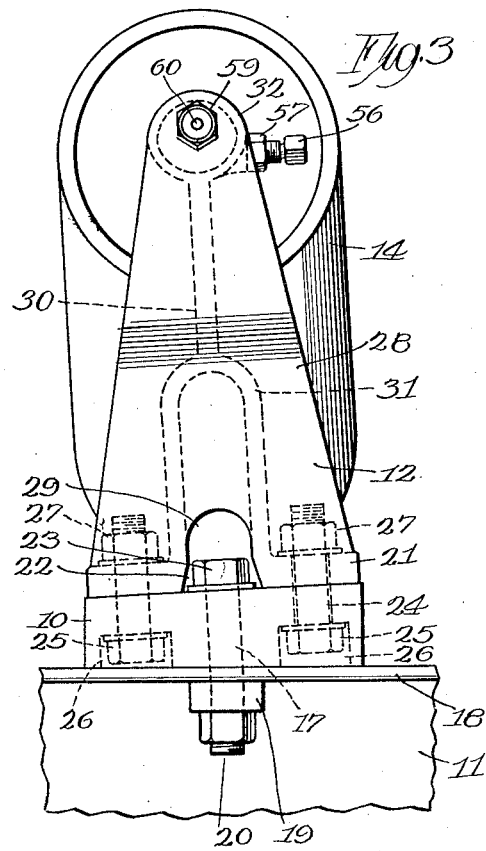
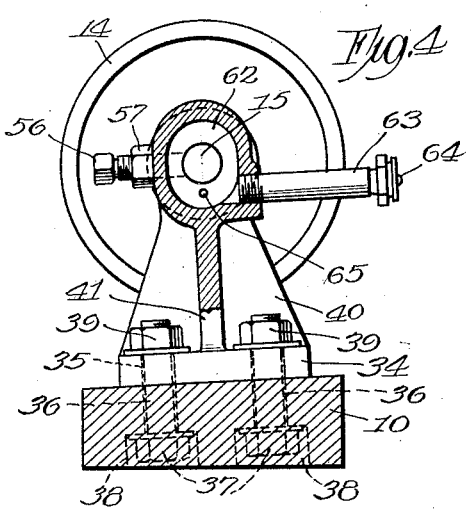
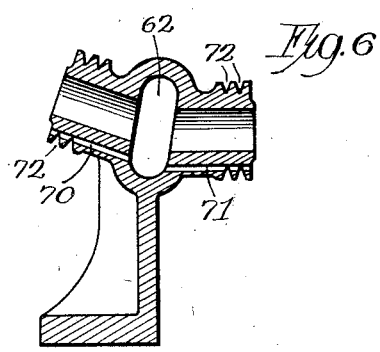
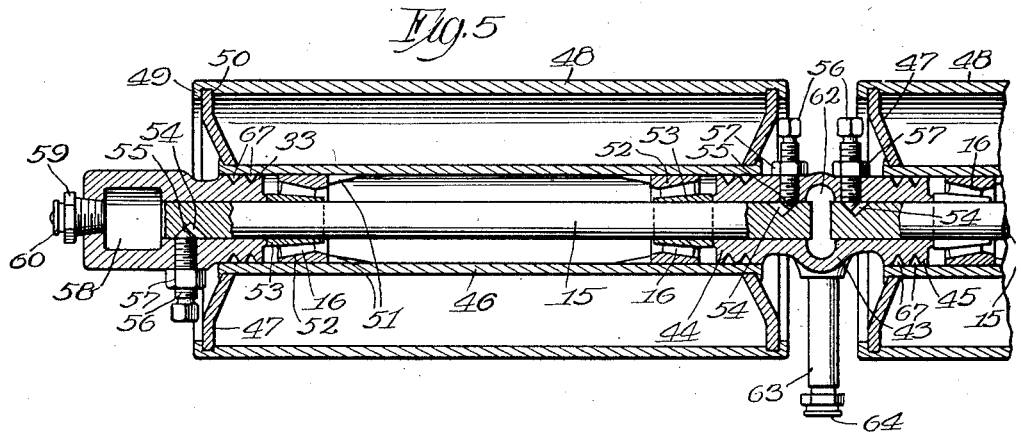
Inventor:
Myron A. Kendall
By Gillson, Mann & Cox,
Attys.

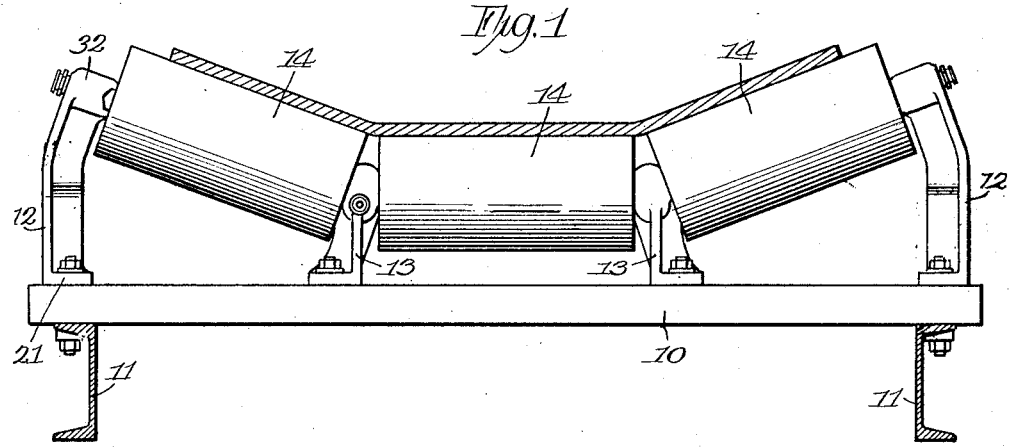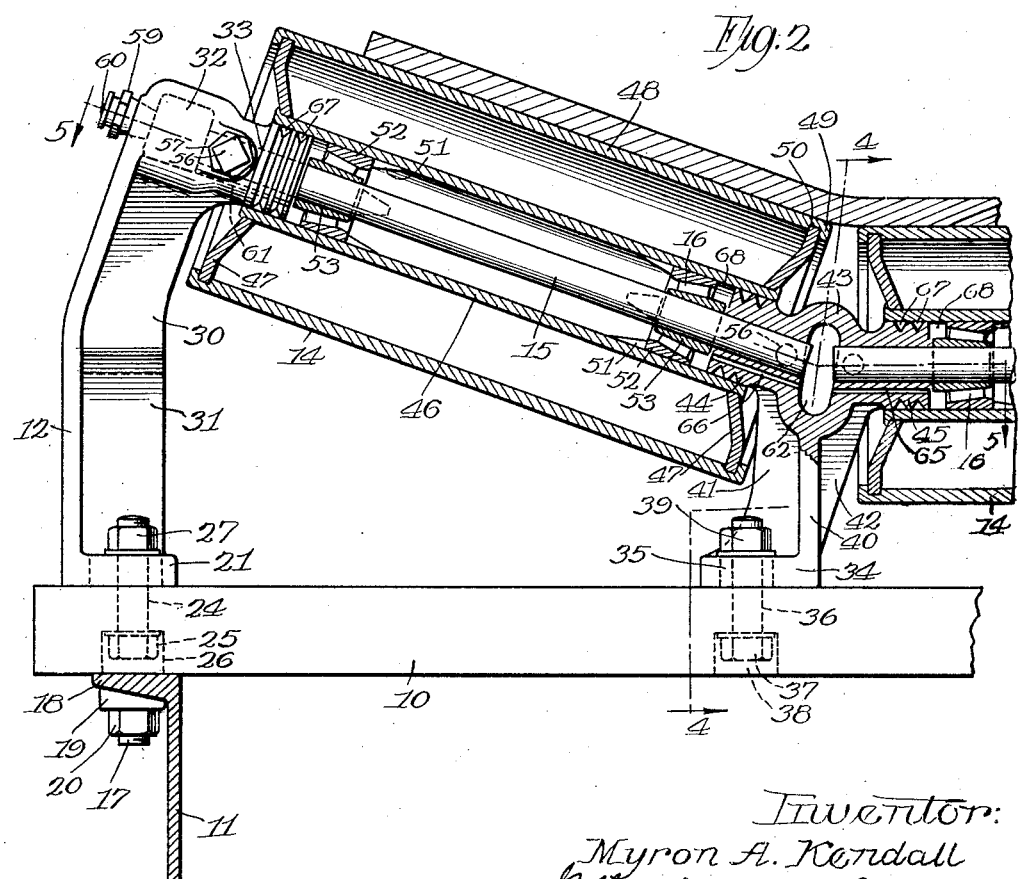

Patented Oct. 29, 1929

1,733,541

UNITED STATES PATENT OFFICE

MYRON A. KENDALL, OF AURORA, ILLINOIS, ASSIGNOR TO STEPHENS-ADAMSON MFG. CO., OF AURORA, ILLINOIS, A CORPORATION OF ILLINOIS

CARRIER FOR CONVEYERS

Application filed April 16, 1926. Serial No. 102,410.

This invention relates to carriers for conveyers and has for its principal objects to reduce the cost of carriers equipped with high grade anti-friction bearings; to provide simple and inexpensive means to adjust taper roller bearings that will be easily accessible after the installation has been made; to reduce the bending moment on the shafts of carrier idlers and permit use of smaller and cheaper shafting and preserve correct alignment of the bearings; to produce better lubricating means that will serve oil or grease with high efficiency to either anti-friction or other bearings; and to reduce the machine work to simple and inexpensive operation.

Further objects and advantages of the invention will be revealed as the description is read in connection with the accompanying drawings, in which Fig. 1 is a side elevation of a carrier including three pulleys, or idlers, the conveyer belt and the supporting girders being shown in section;

Fig. 2 is a longitudinal sectional view of a fragment of the carrier enlarged;

Fig. 3 is an end elevation of the carrier with a fragment of one of the girders;

Figs. 4 and 5 are sectional views taken on the lines 4—4 and 5—5 of Fig. 2, respectively; and Fig. 6 is a vertical section through one of the intermediate brackets, illustrating a slight modification.

The preferred form of three-pulley carrier, illustrated in Fig. 1, includes a beam 10 secured to the supporting girders 11, identical outer brackets 12, identical intermediate brackets 13, idlers or pulleys 14, shafts 15 (Fig. 2) and anti-friction bearings 16.

The beam 10 is tapered transversely, as illustrated in Fig. 3, to incline the carrier in the direction that the load-carrying run of the belt travels. It is secured to the girders by bent bolts 17 which pass through the ends of the beam and the flanges 18 of the girders and are equipped with tapered washers 19 and nuts 20 at their lower ends.

The outer brackets include a foot 21 divided at 22 to accommodate the head 23 of the bolt 17. At each side the foot 21 is slotted to receive a bolt 24 having its head 25 in a socket 26 on the lower side of the beam and equipped at its upper end with a nut 27.

Above the foot the bracket takes the form of a triangular plate 28 (Fig. 3) forked at 29 to accommodate the head 23 of the bolt 17. The plate is strengthened by a rib 30 forked at 31 to permit the bolt 17 to be inserted after the brackets, and other parts, have been assembled to form the carrier.

Above the fork 31 the bracket is inclined inwardly, as shown in Figs. 1 and 2, and terminates in a head 32 from which a downwardly and inwardly extended boss 33 projects. This boss is circular in cross section and made hollow to receive one end of the shaft 15 (Figs. 2 and 5).

Each intermediate bracket includes a foot 34 slotted at 35 to receive a bolt 36 having its head 37 in a pocket 38 on the lower side of the beam 10 and equipped at its upper end with a nut 39. Above the foot it takes the form of a plate 40 reenforced by ribs 41 and 42, and terminating in a head 43 having an upwardly and outwardly inclined boss 44 and an inwardly projecting horizontal boss 45, both of which are circular in cross section and made hollow to receive the corresponding ends of shafts 15.

Each idler comprises a tubular hub 46 welded to disks 47, the peripheries of which are received within rims 48 and held in place by flanges 49 and shoulders 50. Each hub 46 is provided with internal projections 51 struck from the hub to form shoulders against which the outer races 52 of the anti-friction bearings 16 are seated. The inner races 53 of the anti-friction bearings are mounted on the shafts 15 and have their outer ends bearing against the corresponding bosses 33, 44 or 45.

The shafts are provided with conical pockets 54 which cooperate with conical points 55 on studs 56 threaded into the bosses and locked by check nuts 57.

Each head 32 contains a lubricant chamber 58 which is supplied through a nipple 59 having a check valve 60 opening inwardly. The chamber communicates with the bore of the hub through a duct 61.

Each head 43 has a lubricant chamber 62 supplied through a nipple 63 having a check valve 64 also opening inwardly. The chambers 62 communicate with the bores of the adjacent hubs through ducts 65 and 66.

The hubs of the idlers telescope with the bosses 33, 44 and 45, and the latter are provided with grooves 67 to form a dust seal.

The bearings may be adjusted by manipulating the bolts 27 and 36 and the stud 56. For example consider the adjustment of the bearings of the left idler 14 and refer to Figs. 2 and 5. By loosening the bolts 27 and screwing down the stud 56 at the right end of the shaft 15 both that shaft and the bracket 12 will be moved to the right, shortening the distance between the two bosses 33 and 44 and adjusting the inner races 53 with respect to the outer races 52, which latter are fixed in their spaced relation. After such an adjustment the bolts and screws should, of course, be set up and locked. A similar operation will serve to adjust the bearings of the intermediate idler.

Either oil or grease is supplied to the lubricant chambers by attaching a pressure device to the nipples 55 and 63 and the lubricant reaches the bores of the hubs through the ducts 61, 65 and 66. Heretofore it has been customary to supply lubricant through passages delivering through the shaft and communicating with the hub between the bearings. This entailed an expensive machine operation on the shaft and required a supply of large quantities of lubricant in order to insure, especially in the case of grease, that it would reach the bearings. The present construction eliminates the boring of the shaft and supplies the lubricant to the comparatively small chambers 68 directly at the bearings.

In the case of the outer bearings of the outer idlers, the lubricant in the chamber 32 tends naturally to travel to the bearing, whereas in the prior construction where the lubricant passes through the shaft to a point between the bearings, it tends to travel away from the outer bearing.

In the case of intermediate brackets, the relation between the chamber 62 and the duct 66 insures ample lubrication of the adjacent bearing on the left, in Fig. 2, and the corresponding bearing on the right, at the opposite side of the carrier.

The lubricant will tend to work out through the ends of the hub and to collect in the groove 67 and assist in preventing the increase of dust, water and the like.

Where desired the ducts may be made to communicate directly with the grooves, as indicated in Fig. 6 where the ducts 70 and 71 intersect the bottoms of the grooves 72. This is particularly advantageous when grease is used for the pressure will force the grease to fill the grooves by the time the chamber 68 is filled.

The hubs 46 may be made of commercial tubing and the outer races 52 pressed to position against the shoulders 51 in special machines thereby insuring permanent and exact alignment of the bearings. The location of the bearings close to the end supports of the shafts eliminates bending moment, reduces the strain on the shafts to shear, thereby permitting the use of low grade material of small section. The rims 48 of the idlers may also be made of commercial tubing and readily assembled to the stamped disks 47 at low cost.

The outer brackets being identical in form, and the inner brackets also, the number of patterns and parts is reduced to a minimum. The circumference of the bosses and the ducts may be made in a single operation with a box tool, eliminating expensive machining. The threaded apertures for the nipples and the studs may be formed by another tool on the same machine.

Where a larger number of idlers is desired additonal brackets having bosses at appropriate angles can be readily made and the carrier extended to any width that may be required.

From the foregoing it will be seen that the invention results in a structure well adapted to accomplish the objects stated.

While I have used specific illustration and description to make the disclosure clear it is not intended to thereby limit the protection afforded by the patent further than is made necessary by the prior art.

I claim as my invention:

1. In a carrier for conveyers, the combination of a supporting structure, a bracket mounted thereon, a second bracket adjustably mounted on the structure, opposed hollow bosses on said brackets, a shaft supported in the hollow bosses, spaced anti-friction bearings on the shaft, each including an outer race and an inner race, each of the latter bearing against one of the bosses, an idler including a hub mounted upon and fixed to the outer races, and means to adjust the shaft lengthwise with respect to one of said bosses to adjust the anti-friction bearings.

2. In a carrier for conveyers, a transverse support, spaced outer brackets on the support, each having a shaft receiving bore, spaced intermediate brackets between the outer brackets, each having a bore aligned with the bore in the corresponding outer bracket and a bore in alignment with the corresponding bore in the other intermediate bracket, shafts mounted adjacent to their ends in said bores, spaced anti-friction bearings on each shaft, and each including an outer race and an inner race, the latter bearing against the corresponding bracket, an idler on each shaft including a hub fixedly mounted on the outer races, and means for adjusting the shafts lengthwise with respect to the brackets to adjust the anti-friction bearings.

3. In a conveyer, the combination of spaced girders, a transverse bar on the girders, a bolt extending through each end of the bar and the corresponding girder, a bracket at each end of the bar straddling the bolt, and a pair of bolts for each bracket extending through the transverse bar and the bracket on each side of the first mentioned bolt.

4. In a carrier for conveyers, a bracket including an upwardly inclined hollow boss, a lubricant chamber said boss having a duct extending from the chamber through the boss and terminating below the top of the chamber.

5. In a carrier for conveyers, a pair of idlers, a shaft for each idler, antifriction bearings between the idlers and the shafts, a bracket including opposed hollow bosses receiving adjacent ends of the shafts, a lubricant chamber between the bosses, and ducts, apart from the shaft, and extending outwardly from the chamber through the bosses to convey lubricant to the antifriction bearings.

6. In a carrier for conveyers, the combination of a plurality of brackets each having a laterally projecting cylindrical hollow boss opposed to the corresponding boss on the other bracket, a shaft having its ends mounted in the hollow boss, spaced anti-friction bearings on the shaft each including an outer and an inner race, the latter bearing against the corresponding boss, an idler fixed to the outer races, said shaft having tapered openings adjacent to its ends and taper pointed screws mounted in the bracket and cooperating with said openings to adjust the shaft relative to the brackets.

7. In a carrier for conveyers, a bracket, a hollow boss circular in cross section and having a groove in its circumference, a shaft in the hollow boss, an idler including a hub rotatably mounted on the shaft and telescoping with the boss beyond the groove.

8. In a carrier for conveyers, a bracket, a hollow boss on the bracket circular in cross section, a shaft in the hollow boss, an antifriction bearing on the shaft, an idler including a hub mounted on the bearing, a lubricant chamber in the bracket, and a duct through the boss, apart from the shaft, and connecting the chamber with the interior of the hub between the end of the boss and the bearing.

9. In a carrier for conveyers, a bracket, a hollow boss on the bracket circular in cross section, a shaft in the hollow boss, an antifriction bearing on the shaft including an inner race resting against the boss and an outer race spaced from the boss, an idler including a hub mounted on the bearing and telescoping with the boss, a lubricant chamber in the bracket, and a duct through the boss apart from the shaft, and connecting the chamber with the interior of the hub between the boss and the bearing.

10. In a carrier for conveyers, a bracket, a plurality of hollow bosses on the bracket circular in cross section, a shaft having one end mounted in each boss, an anti-friction bearing on each shaft, an idler for each shaft including a hub mounted on the bearing and telescoping with the corresponding boss, a lubricant chamber in the bracket between the bosses and ducts, apart from the shaft, and leading from the chamber through the bosses into the hubs between the ends of the bosses and the bearings.

11. In a carrier for conveyers, a bracket, having a hollow boss therein circular in cross section and provided with a circumferential groove, a shaft having one end mounted in the boss, an idler including a hub mounted on the shaft and telescoping with the boss, a lubricant chamber in the bracket and a duct connecting said chamber with the hub beyond the boss and with the circumferential groove.

12. In a carrier for conveyers, the combination of a pair of brackets each having a smooth circular bore in alignment with the bore in the other bracket, a shaft in the bores, spaced anti-friction bearings on said shaft each including an outer race and an inner race, the thrust of the latter abutting against the corresponding bracket, an idler fixed on the outer races, and means for adjusting one of the brackets relative to the shaft to adjust the anti-friction bearings.

13. In a carrier for conveyers, the combination of a pair of brackets each having a smooth circular bore in alignment with the bore in the other bracket, a shaft in the bores, spaced anti-friction bearings on said shaft each including an outer race and an inner race, the thrust of the latter abutting against the corresponding bracket, an idler fixed on the outer races, and means for adjusting one of the brackets relative to the shaft to adjust the anti-friction bearings comprising a pointed screw in the bracket cooperating with an inclined surface on the shaft.

14. In a carrier for conveyers, the combination of a pair of outer brackets each having a downwardly and inwardly directed smooth surfaced circular bore, a pair of intermediate brackets between the outer brackets each having an upwardly and outwardly directed smooth surfaced circular bore in alignment with the bore in the corresponding outer bracket, and a horizontal and inwardly directed smooth surfaced circular bore in alignment with the corresponding bore in the other intermediate bracket, shafts fixedly mounted in said bore, spaced anti-friction bearings on each shaft each including an outer race and an inner race, the thrust of the latter being against the corresponding bracket, an idler fixed on each set of outer races, and means for adjusting one bracket relative to the corresponding shaft to adjust the anti-friction bearings.

15. In a carrier for conveyers, the combination of a pair of brackets each having a smooth circular bore in alignment with the bore in the other bracket, a shaft in the bores, spaced anti-friction bearings on said shaft each including an outer race and an inner race, the thrust of the latter abutting against the corresponding bracket, an idler fixed on the outer races, and wedge means for connecting one of the brackets to the shaft and adjusting that bracket relatively to the shaft to adjust the anti-friction bearings.

In testimony whereof I affix my signature.

MYRON A. KENDALL.